(No Model.)

L. J. RICHARDS.
COFFEE OR TEA POT AND URN.

No. 374,270. Patented Dec. 6, 1887.

WITNESSES:
A. P. Grant,
L. Douville

INVENTOR:
Lucius J. Richards
BY Joshua A. Liederheim
ATTORNEY.

N. PETERS, Photo-Lithographer, Washington, D. C.

UNITED STATES PATENT OFFICE.

LUCIUS J. RICHARDS, OF PHILADELPHIA, PENNSYLVANIA.

COFFEE OR TEA POT AND URN.

SPECIFICATION forming part of Letters Patent No. 374,270, dated December 6, 1887.

Application filed January 22, 1887. Serial No. 225,151. (No model.)

*To all whom it may concern:*

Be it known that I, LUCIUS J. RICHARDS, a citizen of the United States, residing in the city and county of Philadelphia, State of Pennsylvania, have invented a new and useful Improvement in Coffee or Tea Pots and Urns, which improvement is fully set forth in the following specification and accompanying drawings, in which—

Figure 1:
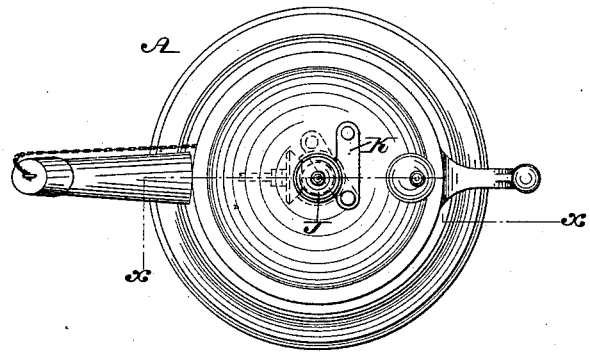
Figure 2:
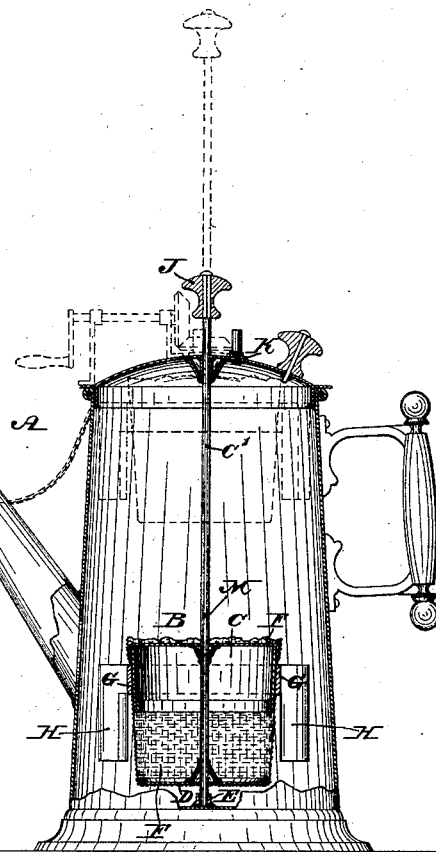
Figure 4:
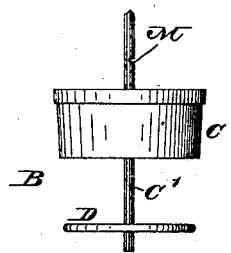
Figure 5:
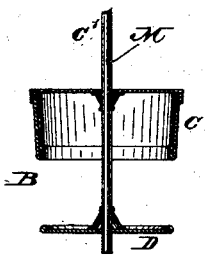
Figure 3:
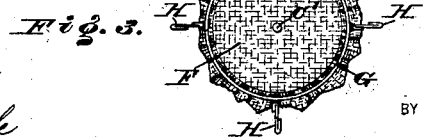

Figure 1 represents a top or plan view of a coffee or tea pot embodying my invention; Fig. 2 represents a vertical section thereof in line $x$ $x$, Fig. 1. Fig. 3 represents a bottom view of a detached portion. Fig. 4 represents a side elevation of a detached portion. Fig. 5 represents a vertical section of the portion shown in Fig. 4.

Similar letters of reference indicate corresponding parts in the several figures.

My invention consists of a coffee or tea pot or urn having a receptacle for the ground coffee or tea-leaves, as will be hereinafter set forth.

It also consists in rendering the receptacle rotatable and providing the same with an agitator, whereby the water is caused to circulate through the ground coffee or tea-leaves in the receptacle and the valuable properties thereof are fully liberated.

Referring to the drawings, A represents a coffee or tea pot which, excepting the features of my invention applied thereto, is of well-known form.

B represents a receptacle for the ground coffee or tea-leaves, the same consisting of an inverted cup, C, which is attached to a vertical rod or stem, C', at the lower end of which is secured a disk or base, D, said rod being fitted in a step, E, on the bottom of the pot. A piece, F, of muslin or other fabric envelops the disk and cup, and is retained in position by a band, G, it being seen that the piece F has an opening at its center, through which the lower end of the rod C' is passed, said piece being placed against the under side of the disk D, and turned upwardly therefrom, so as to envelop the side of the inverted cup C. The band G is applied in position at the bottom of the receptacle and slipped upwardly over the fabric, so as to clamp the same against the wall or side of the cup C, said wall and band being somewhat conical, whereby the band is held tightly against the fabric, a closed receptacle being produced which is adapted to contain the ground coffee or tea-leaves, the latter being placed within the cup C before the fabric or covering F is located and secured.

Radiating from the band G are vanes H, which, with the band, are made of metal or other suitable material.

The rod C' passes freely through the lid of the pot, and has its upper end squared to hold a removable knob or handle, J.

Pivoted to the upper side of the lid is a latch, K, which is adapted to engage with a notch, M, in the rod C' for holding the receptacle B in elevated position within the pot.

It will be seen that when the parts are in position, as shown in Fig. 1, the receptacle may be rotated by means of the knob J, whereby the water in the pot effectively saturates the contents of the receptacle, the fabric covering of the latter permitting the water to enter the receptacle and the extracted coffee or tea to escape therefrom. The vanes also agitate or churn the water, causing forcible action of the same on the contents of the receptacle, whereby extraction of the valuable properties of the coffee or tea is quickly accomplished. The receptacle may now be raised by means of the knob J, and held by the engagement of the latch K with the notch M, after which the coffee or tea may be poured out from the pot as desired. When the knob J is displaced, the rod C' may be disconnected from the lid. When the band G is slipped from its position, the fabric covering F may be removed, whereby the interior of the body of the receptacle is accessible, so that the contents of the receptacle may be discharged and the parts washed or cleansed.

If desired, gearing may be employed for rotating the receptacle, as shown by the dotted lines, Fig. 2.

Having thus described my invention, what I claim as new, and desire to secure by Letters Patent, is—

1. A coffee-pot having the step E on the base thereof, in combination with rod C', having knob J, and adapted to have a bearing in said step, whereby the same may be readily rotated, and a coffee-receptacle secured to said rod, substantially as and for the purpose set forth.

2. A receptacle for a coffee or tea pot, consisting of a body formed of the inverted cup C, the disk D, the fabric covering F, and band G, provided with projecting vanes, substantially as described.

3. In a receptacle for a coffee or tea pot, an inverted cup, a rod, and a base to said rod, in combination with a piece of fabric covering the base and turned up around the cup, and a band clamping the fabric to the cup, substantially as and for the purpose set forth.

4. In a receptacle for a coffee or tea pot, an inverted cup, a rod passing through the lid of the pot, and a base attached to said rod, in combination with a piece of fabric covering the base and turned up around the cup, and a band clamping the fabric to the cup, substantially as and for the purpose set forth.

LUCIUS J. RICHARDS.

Witnesses:
JOHN A. WIEDERSHEIM,
A. P. GRANT.